United States Patent
Miller et al.

(10) Patent No.: US 9,531,202 B2
(45) Date of Patent: Dec. 27, 2016

(54) BATTERY MANAGEMENT SYSTEM AND METHOD FOR CHARGING LITHIUM-ION BATTERY CELLS IN AN INFORMATION HANDLING SYSTEM

(71) Applicant: DELL, INC., Round Rock, TX (US)

(72) Inventors: Bruce A. Miller, Geo, TX (US); Maureen Emily Martinez, Round Rock, TX (US); Nikhil M. Vichare, Austin, TX (US); Richard C. Thompson, Cedar Park, TX (US); Marc Allan Richmond, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 267 days.

(21) Appl. No.: 14/202,270

(22) Filed: Mar. 10, 2014

(65) Prior Publication Data
US 2015/0256004 A1    Sep. 10, 2015

(51) Int. Cl.
*H02J 7/14*    (2006.01)
*H02J 7/00*    (2006.01)
*H01M 10/44*    (2006.01)

(52) U.S. Cl.
CPC ............ *H02J 7/0021* (2013.01); *H02J 7/0022* (2013.01); *H02J 7/0026* (2013.01); *H01M 10/44* (2013.01); *H02J 7/0052* (2013.01)

(58) Field of Classification Search
USPC ............... 320/162, 107, 106, 132, 134, 155, 160,320/125, 138, 152, 157
See application file for complete search history.

(56) References Cited

U.S. PATENT DOCUMENTS

| | | | | |
|---|---|---|---|---|
| 6,275,006 B1* | 8/2001 | Koike | .................... | H02J 7/0073 320/125 |
| 2009/0070052 A1* | 3/2009 | Taniguchi | .......... | G01R 31/3651 702/63 |
| 2010/0085012 A1* | 4/2010 | Cruise | ................. | H01M 10/441 320/134 |
| 2010/0327818 A1* | 12/2010 | Taniguchi | ........... | H01M 10/441 320/162 |
| 2011/0115442 A1* | 5/2011 | Garrastacho | ....... | G01R 31/3637 320/157 |
| 2012/0249083 A1* | 10/2012 | Garrastacho | ............ | H02J 7/027 320/155 |
| 2014/0203762 A1* | 7/2014 | Kato | ..................... | H02J 7/0031 320/107 |
| 2015/0123595 A1* | 5/2015 | Hussain | ................ | H02J 7/0052 320/107 |

* cited by examiner

*Primary Examiner* — Alexis A Boateng
(74) *Attorney, Agent, or Firm* — Isidore PLLC (57) ABSTRACT

A computer-implemented method enables capacity based pre-charging and age based permanent failure detection in a battery. The method comprises detecting, via a controller, a real time cell voltage for at least one cell in the battery. The controller determines if the real time cell voltage is less than a normal operating cell voltage. In response to the real time cell voltage being less than the normal operating cell voltage, a capacity based pre-charge value is calculated based on a full charge capacity and at least one cell parameter of the cell. A pre-charge time is calculated based on the capacity based pre-charge value. A pre-charge voltage is identified. The battery management controller is triggered to pre-charge the battery using the calculated pre-charge time and the identified pre-charge voltage.

21 Claims, 6 Drawing Sheets

Cell Parameters & Data 230

| Cell | Cell Type 312 | Chemistry Correction Factor 314 | Total Number of Over Discharge Events 316 | Total Number of Discharge Cycles 318 | Pre-charge Voltage (Vp) 244 |
|---|---|---|---|---|---|
| 220 | B3 | 1.1 | 3 | 275 | 2.1 |
| 222 | G8 | 1.2 | | | |
| 224 | Y7 | 1.3 | | | |
| 226 | W6 | 0.8 | | | |
| 228 | T1 | 0.9 | | | |
| 230 | T4 | 1.0 | | | |

BATTERY MANAGEMENT SYSTEM AND METHOD FOR CHARGING LITHIUM-ION BATTERY CELLS IN AN INFORMATION HANDLING SYSTEM

BACKGROUND

1. Technical Field

The present disclosure generally relates to battery charging and in particular to enabling capacity based pre-charging of batteries in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems utilize batteries as either a primary power source or as a backup power source. One example of an information handling system that uses batteries is a laptop computer. The battery allows the laptop computer to be used in a mobile setting without being connected to a source of utility power. Lithium ion (Li-ion) batteries are widely used in laptop computers. Li-ion batteries can be formed from one or more Li-ion cells and offer a high energy density and long life.

However, Li-ion cells also have several problems. For example, Li-ion cells can become over-discharged for several reasons, such as leakage current in the battery circuitry or because of an internal short. In some cases, recovery from an over-discharged state may not be possible. Li-ion cells require special handling to recover from an over-discharged state and recovery is dependent upon the cell voltage. If a Li-ion cell is over-discharged, there is a possibility of anodic dissolution and extraction of copper (Cu) to form free Cu2+ ions. When the cell is subsequently charged, under the voltage difference between the cathode and anode, the Cu2+ ions can penetrate through an internal separator and cause copper shunts. This internal short circuit may lead to the activation of safety devices within the cell causing one of a permanent cell failure or blowing of a fuse within a battery protection circuit.

After a Li-ion cell has become over discharged, a pre-charging process is required prior to the application of full charging current. If the battery is deeply discharged, a small pre-conditioning charge of approximately 10 percent of the full charge current is applied to check the cell before applying full charging current. After pre-charging, the cell is returned to a standard operating mode and is charged according to the regular charging procedure.

BRIEF SUMMARY

Disclosed is a computer implemented method, a battery management system and an information handling system to enable capacity based pre-charging of a battery having at least one cell.

According to one embodiment, the method comprises detecting, via a battery management controller, a real time cell voltage for at least one cell in the battery. The battery management controller determines if the real time cell voltage is less than a normal operating cell voltage. In response to the real time cell voltage being less than the normal operating cell voltage, a capacity based pre-charge value is calculated based on a full charge capacity and at least one cell parameter of the cell. The method further includes calculating a pre-charge time based at least partially on the capacity based pre-charge value and identifying a pre-charge voltage. The battery management controller is triggered to pre-charge the battery using the calculated pre-charge time and the identified pre-charge voltage.

According to another embodiment, the battery management system comprises a battery having at least one cell and a battery management controller coupled to the battery. The battery management controller has firmware executing thereon to enable capacity based pre-charging of the battery. The firmware configures the battery management controller to detect a real time cell voltage for at least one of the cells in the battery and determine if the real time cell voltage is less than a normal operating cell voltage. In response to the real time cell voltage being less than the normal operating cell voltage, a capacity based pre-charge value is calculated based on a full charge capacity and at least one cell parameter of the cell. A pre-charge time is calculated based at least partially on the capacity based pre-charge value. A pre-charge voltage is identified. The battery management controller is triggered to pre-charge the battery using the calculated pre-charge time and the identified pre-charge voltage.

Also disclosed is an information handling system (IHS) that comprises a battery having at least one cell. The battery operates to supply power to the information handling system, which includes a processor and a memory coupled to the processor via a system interconnect. A battery management controller is communicatively coupled to the system interconnect and is connected to the battery. The battery management controller has firmware executing thereon to enable capacity based pre-charging of the battery. The firmware configures the battery management controller to detect a real time cell voltage for the at least one cell in the battery and determine if the real time cell voltage is less than a normal operating cell voltage. In response to the real time cell voltage being less than the normal operating cell voltage, a capacity based pre-charge value is calculated based on a full charge capacity and at least one cell parameter of the cell. A pre-charge time is calculated based at least partially on the capacity based pre-charge value. A pre-charge voltage is identified. The battery management controller is triggered to pre-charge the battery using the calculated pre-charge time and the identified pre-charge voltage.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a battery management system, an information handling system and a computer implemented method performed within the information handling system to enable capacity based pre-charging of a battery having at least one cell.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
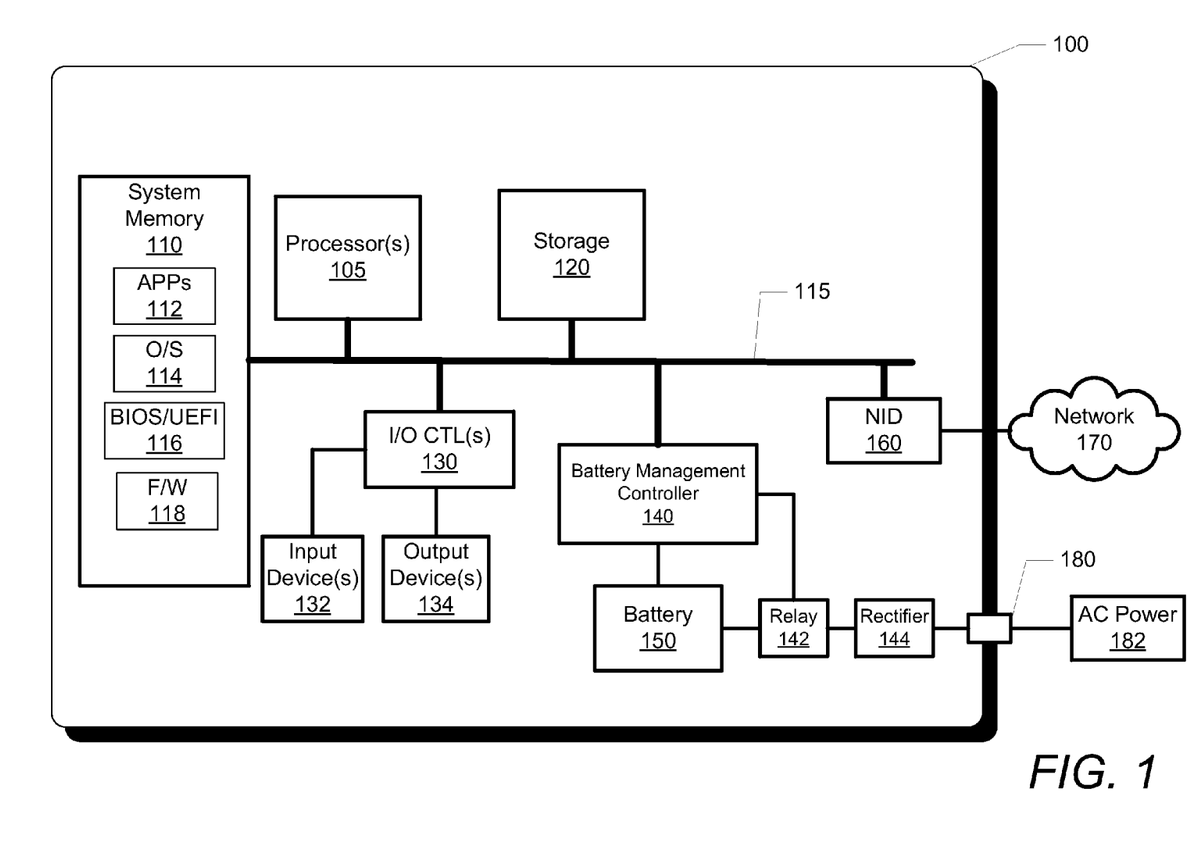
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, basic input/output system (BIOS) 116 and firmware (F/W) 118.

In one or more embodiments, BIOS 116 comprises additional functionality associated with unified extensible firmware interface (UEFI), and can be more completely referred to as BIOS/UEFI in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s) or light emitting diodes (LEDs).

Additionally, in one or more embodiments, IHS 100 includes one or more battery(ies) or battery pack 150 that supply power to various components of IHS 100. In one embodiment, battery 150 can be multiple Li-ion cells that are connected either in series or in parallel. Battery 150 can supply a range of voltages and currents depending upon the requirements of IHS 100. IHS 100 further includes a battery management controller (BMC) 140 that is connected to battery 150. Battery management controller 140 is in communication with processor(s) 105 and system memory 110 via system interconnect 115. BMC 140 contains components that enable capacity-based pre-charging of battery 150 and age-based permanent failure detection in battery 150. BMC 140 can at least partially control the operation of battery 150. In one embodiment, BMC 140 controls the charging and discharging of battery 150. Battery management controller 140 can also be referred to as a battery management unit (BMU) or simply as a controller. An AC power source 182 is connectable to an AC power connector 180 to provide power to IHS 100 and to recharge battery 150. The AC power connector 180 is connected to a rectifier 144 that supplies DC power to relay 142. Relay 142 is connected between rectifier 144 and battery 150 by a power line. BMC 140 is connected to relay 142 by a communication signal line. BMC 140 controls the application of power to battery 150 via relay 142 to provide power to IHS 100 and to recharge battery 150.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprises multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

Figure 2:
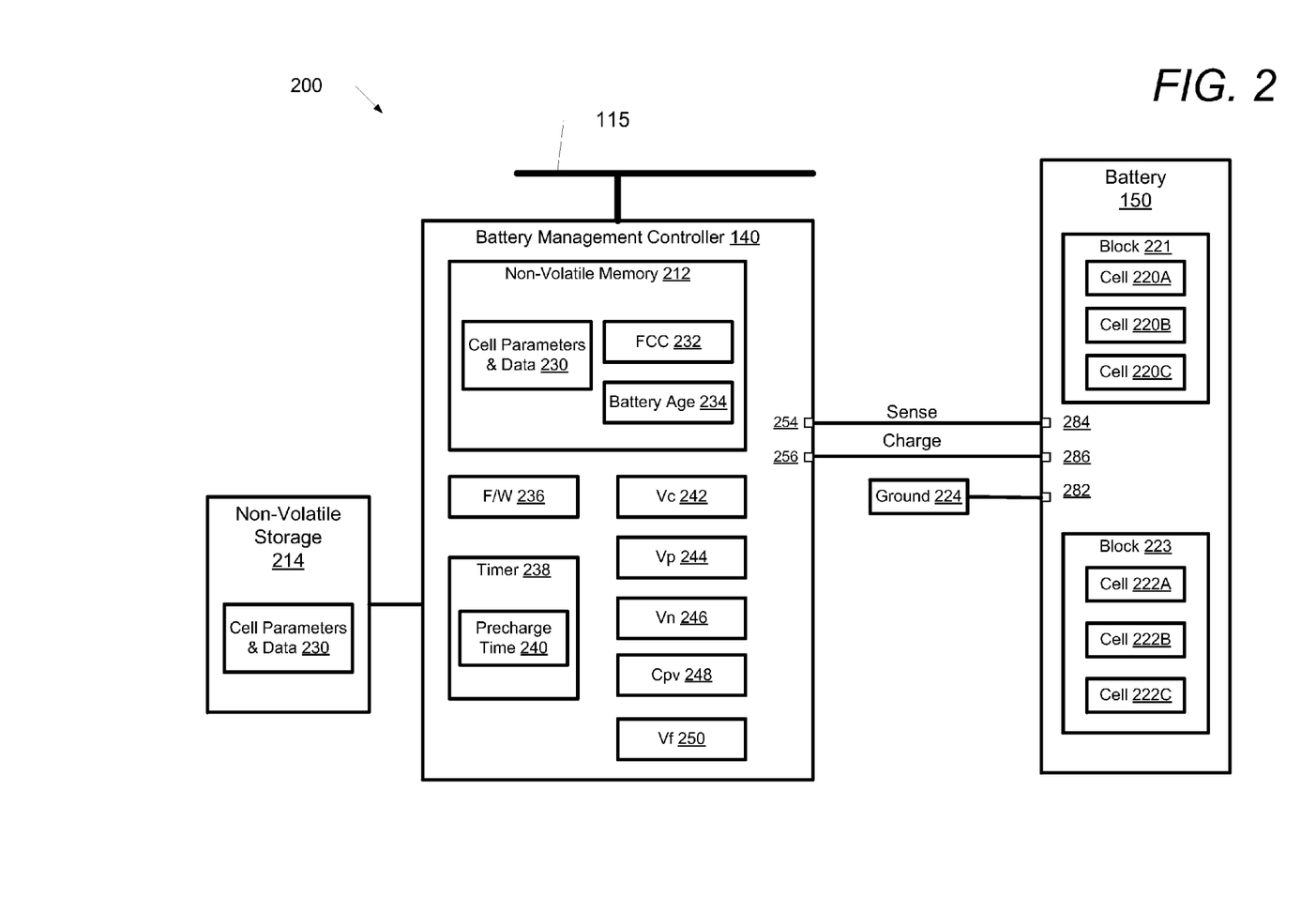
FIG. 2 illustrates a component level view of a battery management sub-system having a battery management controller and other functional components that support capacity-based pre-charging of batteries, in accordance with one embodiment.

With reference now to FIG. 2, there is illustrated one embodiment of a component level view of a battery management sub-system 200 that supports capacity-based pre-charging of battery 150 and age-based permanent failure detection in battery 150. Battery management sub-system 200 comprises battery management controller (BMC) 140, battery 150 and non-volatile storage 214. BMC 140 is coupled to system interconnect 115 in order to communicate with other components of IHS 100.

Battery 150 comprises one or more battery cells 220A-C and 222A-C. Cells 220A-C and 222A-C can be connected in series or in parallel or in a combination of series and parallel. In an embodiment, cells 220A-C are connected in parallel to form block 221 and cells 222A-C are connected in parallel to form block 223. Blocks 221 and 223 can be connected in series to form battery pack 150. When individual cells 220A-C and 222A-C are connected in parallel, the functions of the present disclosure that enable capacity based pre-charging and age based permanent failure detection in battery 150 are performed at the block level. In other words, cells that are connected in parallel are monitored as a single block. In one embodiment, cells 220A-C and 222A-C are lithium-ion (Li-ion) cells. The Li-ion cells can be made from a variety of anode, cathode and electrolyte materials, each of which have a specific composition. Because the Li-ion cells can have a variety of cathode, anode and electrolyte materials, the energy density and voltage can vary according to the electrochemistry of the cell. Each of cells 220A-C and 222A-C has a real time cell voltage (Vc). Battery 150 has terminals 282, 284 and 286. Terminal 282 is connected to ground 224. Terminal 284 is a sense terminal used to sense the real time cell voltages, and terminal 286 is a charge terminal used to recharge the cells.

BMC 140 has a terminal 254 coupled to sense terminal 284 and a terminal 256 coupled to charge terminal 286. BMC 140 controls the charging of battery 150. BMC 140 includes an internal non-volatile memory 212. Memory 212 can be a persistent storage device such as flash memory that retains data without power. In at least one embodiment, memory 212 can store cell parameters and data 230, full charge capacity (FCC) 232 and battery age 234. Cell parameters and data 230 include data that is specific to the particular battery cells used in battery 150. In one embodiment, cell parameters and data 230 is or includes a lookup table that maps the specific battery cell to a chemistry correction factor that is dependent upon the specific electrochemical composition and performance of the battery cell. In another embodiment, cell parameters and data 230 are stored in a non-volatile storage device 214, such as flash memory or a solid state drive. BMC 140 is in communication with non-volatile storage device 214 and can read cell parameters and data 230 from non-volatile storage device 214.

FCC 232 represents the initial or last measured full discharge capacity of the battery 150. FCC 232 is used as the battery full-charge reference for relative capacity indication. The value of FCC 232 is tracked by BMC 140 over time and is updated after the battery undergoes a qualified discharge from a nearly full to a low battery level and is then stored to memory 212. The value of FCC 232 can then be read from memory 212. Battery age 234 is the total cumulative time that the battery 150 has been in use. Battery age 234 is tracked by BMC 140 and stored in memory 212.

BMC 140 further includes firmware (F/W) 236 and a timer 238. Firmware (F/W) 236 executes within BMC 140 to enable capacity based pre-charging of battery 150 and age based permanent failure detection in battery 150. Timer 238 is used to track a pre-charge time 240. BMC 140 further tracks the real time cell voltage (Vc) 242 for each of cells 220A-C and 222A-C. BMC 140 calculates a capacity based pre-charge value (Cpv) 248 for each of cells 220A-C and 222A-C. BMC 140 also includes a pre-charge voltage (Vp) 244. In one embodiment, pre-charge voltage (Vp) 244 is pre-determined and stored in cell parameters and data 230. In another embodiment, the pre-charge voltage (Vp) 244 is calculated by BMC 140 based on cell parameters and data 230. BMC 140 also includes a normal cell operating voltage (Vn) 246 for each of cells 220A-C and 222A-C. Using one or more of the battery parameters maintained by BMC 140 and/or stored in memory 212, BMC 140 calculates a permanent failure cell voltage (Vf) 250 that is based on battery age 234.

Figure 3:
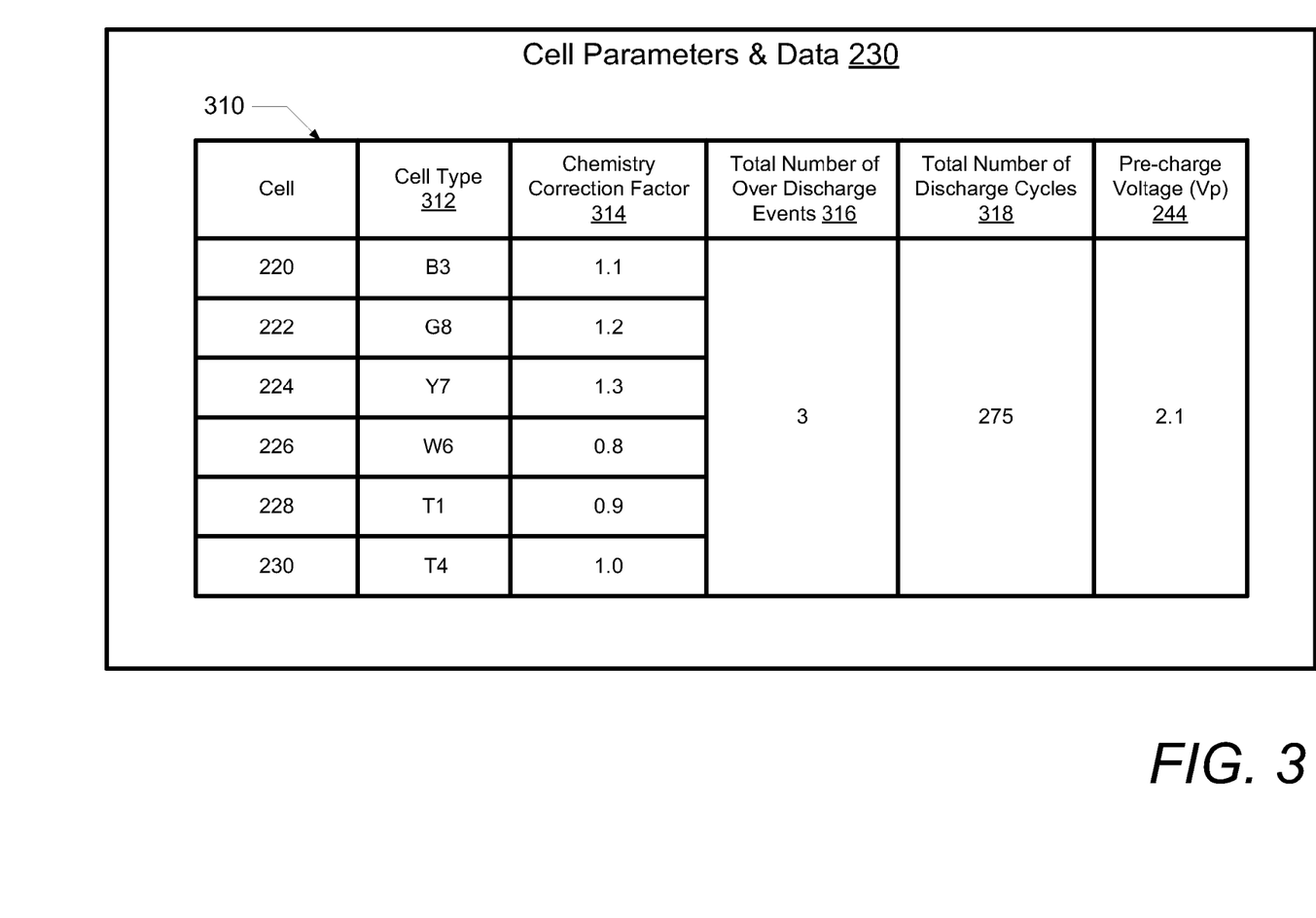
FIG. 3 illustrates a lookup table containing cell parameters and data stored in the battery management controller, in accordance with one embodiment.

FIG. 3 illustrates further details of cell parameters and data 230 that are stored in non-volatile memory 212 or in non-volatile storage device 214. Cell parameters and data 230 are used in calculations by BMC 140 to enable capacity based pre-charging and age based permanent failure detection in battery 150. In the illustrative embodiment, cell parameters and data 230 includes a lookup table 310 that maps each one of the specific battery cells 220A-C and 222A-C to a cell type 312 and a chemistry correction factor 314. The chemistry correction factor 314 is dependent upon the specific material and chemical composition of the cell. In one embodiment, cells 220 can be B3 type cells that are formed with lithium cobalt oxide cathodes and an ethylene carbonate electrolyte that contains complexes of lithium ions. B3 type cells have a chemistry correction factor of 1.1. In another embodiment, cells 222 can be G8 type cells that are formed with lithium iron phosphate cathodes and a diethyl carbonate electrolyte that contains complexes of lithium ions. G8 type cells have a chemistry correction factor of 1.2.

Cell parameters and data 230 can also include other parameters that can be used in capacity based pre-charging and age based permanent failure detection of battery 150. A total number of over discharge events 316 and a total number of a discharge cycles 318 for battery 150 are stored in lookup table 310. A pre-charge voltage (Vp) 244 is stored in lookup table 310. The pre-charge voltage (Vp) 244 can be pre-determined and stored in cell parameters and data 230. The pre-charge voltage (Vp) 244 is based on the cell chemistry correction factor 314. In one embodiment, cell parameters and data 230 can be stored on a cloud storage device and accessed via network 170 (FIG. 1).

During operation of the information handling system 100, firmware 236 runs or executes on BMC 140. Firmware 236 functions to control the pre-charging of cells 220A-C and 222A-C based on the capacity of the cells. BMC 140 detects a real time cell voltage Vc 242 for an individual cell, group of cells or for all of the cells and determines if the real time cell voltage is less than a normal operating cell voltage Vn 246. In response to the real time cell voltage Vc 242 being less than the normal operating cell voltage Vn 246, BMC 140 reads the full charge capacity 232 and at least one of the cell parameters (i.e., the chemistry correction factor 314) from memory 212. BMC 140 calculates a capacity based pre-charge value Cpv 248 based on FCC 232 and the chemistry correction factor 314. BMC 140 then calculates a pre-charge time 240 based at least partially on the capacity based pre-charge value 248. BMC 140 also reads the pre-determined pre-charge voltage (Vp) 244 that is stored in lookup table 310. In another embodiment, BMC 140 calculates the pre-charge voltage 244 based at least partially on the capacity based pre-charge value 248.

BMC 140 is triggered to or initiates pre-charging the battery 150 using the calculated pre-charge voltage 244 and starts timer 238 in response to the trigger. Timer 238 is set to countdown the pre-charge time 240. BMC 140 monitors the timer 238 and determines if the precharge time 240 has expired. If the pre-charge time 240 has expired, BMC 140 detects the real time cell voltage 242 and determines if the real time cell voltage is greater than the pre-charge voltage 244. In response to the real time cell voltage 242 not being greater than the pre-charge voltage 244, BMC 140 prevents the battery 150 from being re-charged and indicates the battery as being defective. In response to the real time cell voltage 242 being greater than the pre-charge voltage 244, BMC 140 allows battery 150 to be recharged.

Those of ordinary skill in the art will appreciate that the hardware components and basic configuration depicted in FIGS. 1-3 and described herein may vary. For example, the illustrative components within IHS 100 (FIG. 1) and battery management subsystem 200 (FIG. 2) are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 4:
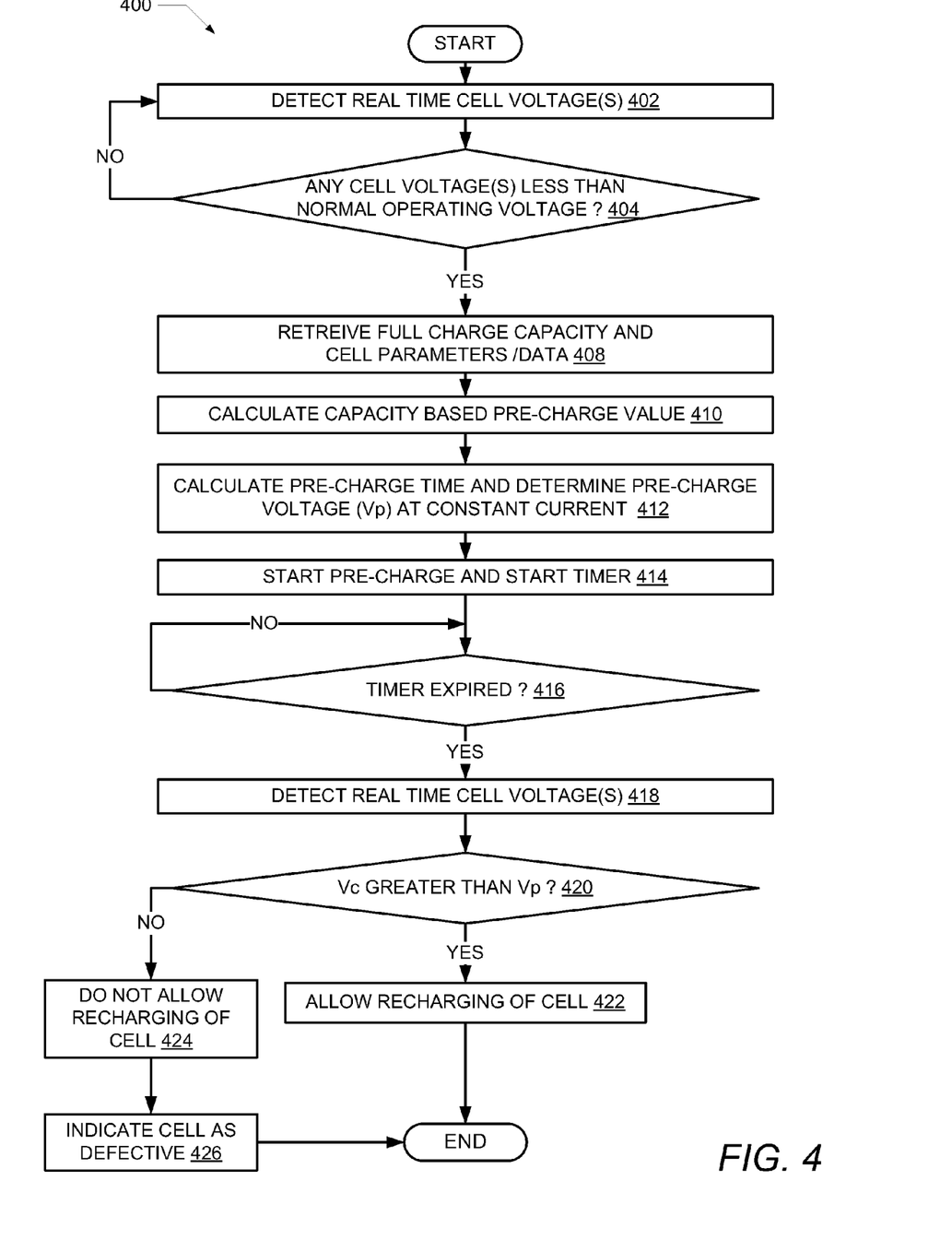
FIG. 4 is a flow chart illustrating one example of the method by which capacity based pre-charging of batteries in an information handling system occurs, according to one or more embodiments.
Figure 5:
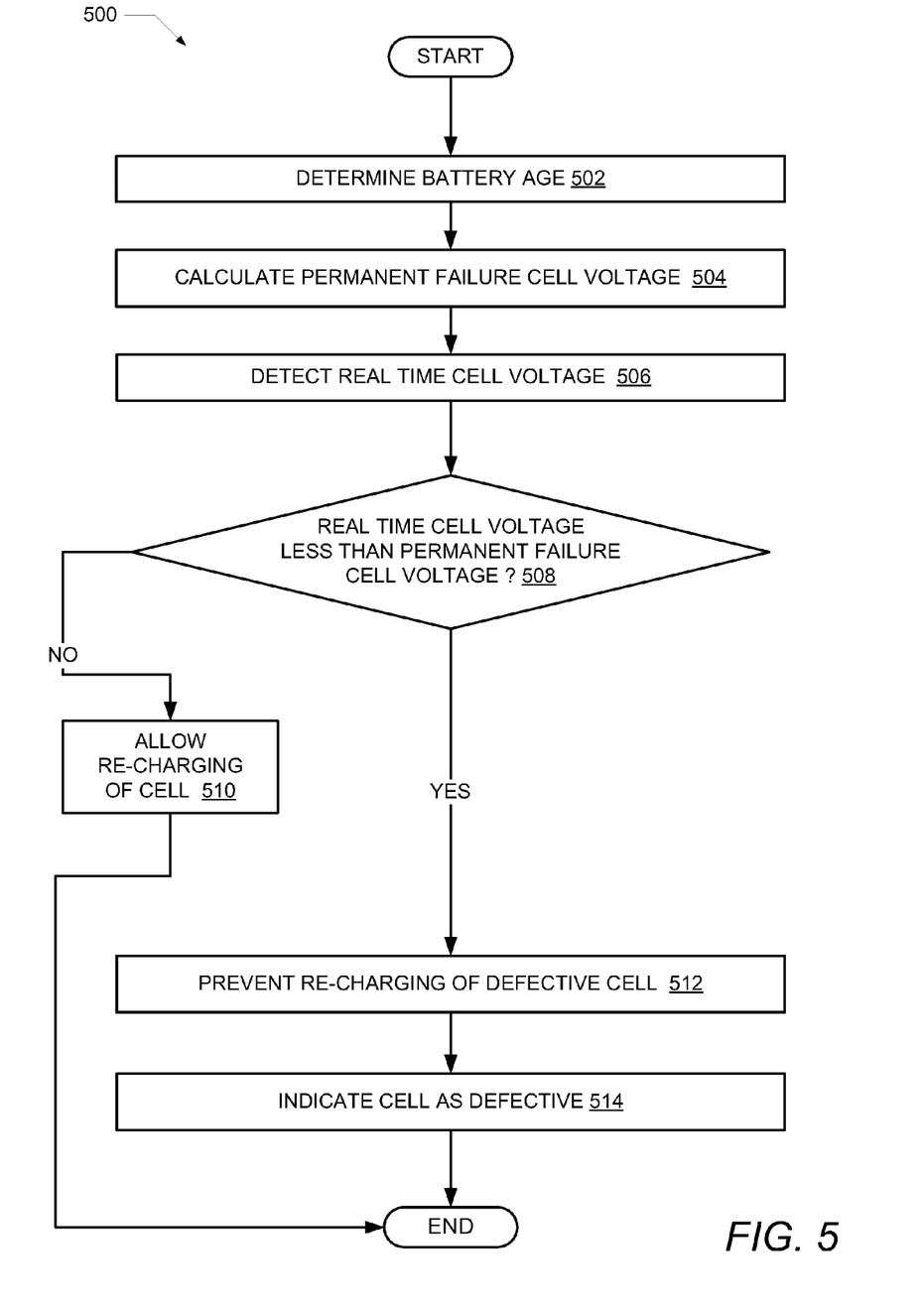
FIG. 5 is a flow chart illustrating one example of the method by which age based permanent failure detection of batteries in an information handling system is determined, according to one or more embodiments.

The following flowcharts of FIGS. 4 and 5 disclose specific functionality provided by BMC 140 and specifically by the execution of firmware 236 within BMC 140 related to enabling capacity based pre-charging and age based permanent failure detection in battery 150. According to one embodiment, firmware 236 includes program code that when executed configures the BMC 140 to provide the various functions described within the present disclosure.

FIGS. 4 and 5 illustrate flowcharts of exemplary methods by which BMC 140 within the preceding figures performs different aspects of the processes that enable the one or more embodiments of the disclosure. Generally, method 400 and method 500 collectively represent computer-implemented methods to enable capacity based pre-charging and age based permanent failure detection in battery 150. The description of each method is provided with general reference to the specific components illustrated within the preceding FIGS. 1-3. Generally, each method is described as being implemented via battery management subsystem 200 and particularly the execution of code provided by firmware 236 within BMC 140. It is however appreciated that certain aspects of the described methods may be implemented via other processing devices and/or execution of other code.

Method 400 illustrates a process for capacity based pre-charging for battery 150. Method 400 begins at the start block and proceeds to block 402 where BMC 140 detects a real time cell voltage Vc 242 for at least one of the cells 220A-C and 222A-C within battery 150. In one embodiment, BMC 140 can detect the real time cell voltage Vc 242 for blocks 221 and 223. In another embodiment, BMC 140 can detect the real time cell voltage Vc 242 for battery 150. BMC 140 determines if the real time cell voltage(s) are less than a normal operating cell voltage Vn 246 (decision block 404). In response to the real time cell voltage(s) not being less than the normal operating cell voltage for one or more the cells or blocks, BMC 140 continues to detect the real time cell voltage(s) (block 402). In response to the real time cell voltage(s) being less than the normal operating cell voltage for one or more cells or blocks, BMC 140 retrieves or reads the full charge capacity (FCC) 232 and one or more cell parameters and data 230 such as the chemistry correction factor 314, from lookup table 300, stored in memory 212 (block 408).

BMC 140 calculates a capacity based pre-charge value Cpv 248 based on FCC 232 and at least one of the cell parameters such as chemistry correction factor 314 (block 410). BMC 140 then calculates a pre-charge time 240 based at least partially on the capacity based pre-charge value 248 and determines a pre-charge voltage 244 (block 412). BMC 140 determines pre-charge voltage 244 by reading or retrieving the pre-determined pre-charge voltage 244 from lookup table 310. BMC 140 initiates pre-charging of battery 150 by applying the calculated pre-charge voltage to the battery 150 and starts timer 238 to countdown the pre-charge time 240 (block 414). BMC 140 determines if the pre-charge time 240 has expired (decision block 416). If the pre-charge time 240 has not expired, BMC 140 continues to wait for the timer 238 to expire (block 416). If the pre-charge time 240 has expired, BMC 140 detects the real time cell voltage Vc 242 (block 418) and determines (decision block 420) if the real time cell voltage Vc 242 is greater than the pre-charge voltage Vp 244. In response to the real time cell voltage Vc 242 not being greater than the pre-charge voltage Vp 244, BMC 140 prevents battery 150 from being recharged (block 424) and indicates battery 150 cell as being defective (block 426). BMC 140 indicates that the battery 150 is defective using one or more of output devices 134 such as a monitor or display device or audio speaker(s) or light emitting diodes (LEDs). In one embodiment, BMC 140 transmits a signal to I/O controller 130 triggering output devices 134 to indicate that the battery 150 is defective. In another embodiment, individual battery cells or blocks can be indicated as defective. Method 400 then ends. In response to the real time cell voltage Vc 242 being greater than the pre-charge voltage Vp 244, BMC 140 allows battery 150 to be recharged (block 422). Method 400 then terminates.

Method 400, which includes the use of cell parameters and data 230 and FCC 232 in the calculation of pre-charge time 240 and pre-charge voltage 244 by BMC 140, allows for customized pre-charging of the battery 150 based on the type of cell and the full charge capacity of the battery 150. Method 400 modifies the pre-charge time 240 and pre-charge voltage 244 based on specific battery conditions. The use of method 400 provides improved battery pre-charging and recovery from an over-discharged battery state.

Referring to FIG. 5, method 500 illustrates a process for age based permanent failure detection for battery 150. Method 500 begins at the start block and proceeds to block 502 where BMC 140 determines the battery age 234 by reading battery age 234 from memory 212. BMC 140 calculates a permanent failure cell voltage (Vf) 250 based on the battery age 234 (block 504). At block 506, BMC 140, detects a real time cell voltage Vc 242 for one or more cells 220A-C and 222A-C or blocks 221, 223 within battery 150. BMC 140 determines if the real time cell voltage(s) Vc 242 are less than the permanent failure cell voltage (Vf) 250 (decision block 508). In response to the real time cell voltage(s) Vc 242 not being less than the permanent failure cell voltage (Vf) 250, BMC 140 allows battery 150 to be recharged (block 510). Method 500 then ends.

In response to the real time cell voltage(s) Vc 242 being less than the permanent failure cell voltage (Vf) 250 for one or more of cells 220A-C and/or 222A-C, and/or blocks 221/223 BMC 140 prevents recharging of battery 150 (block 512). At block 514, BMC 140 indicates that battery 150 is defective using one or more of output devices 134 such as a monitor or display device or audio speaker(s) or light emitting diodes (LEDs). BMC 140 transmits a signal to I/O controller 130 triggering output device(s) 134 to indicate that battery 150 is defective. Method 500 then ends.

Figure 6:
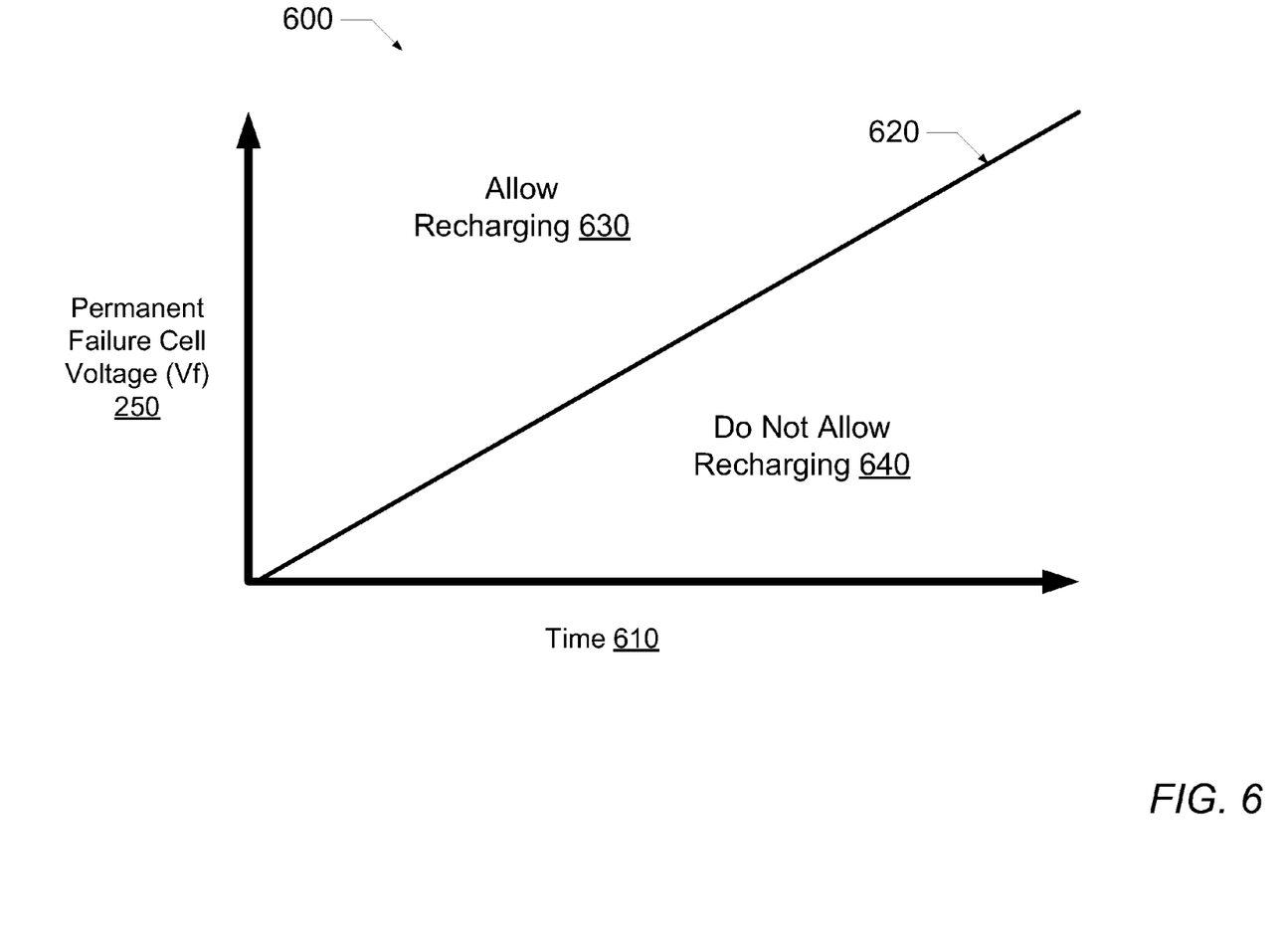
FIG. 6 is a graph of permanent failure cell voltage versus time illustrating the increase in permanent failure cell voltage with time, according to one or more embodiments.

With additional reference to FIG. 6, a graph of permanent failure cell voltage versus time is shown. Graph 600 illustrates how the permanent failure cell voltage 250 calculated using method 500 increases with time 610. As the battery age 234 increases with time, the permanent failure cell voltage Vf 250 also increases. Above the graph line 620, BMC 140 allows the battery 150 to be recharged (area 630). Below the graph line 620, BMC 140 prevents the battery 150 from being recharged (area 640). The use of method 500, including the calculation of permanent failure cell voltage 250 by BMC 140, allows for the recharging of Li-ion batteries that have life remaining and prevents the recharging of Li-ion batteries that have exceeded their life expectancy. The use of method 500 thus provides improved battery life.

While methods 400 and 500 are illustrated as being performed by BMC 140, in another embodiment, cell parameters and data 230 can be stored on a cloud storage device (not shown) and accessed via network 170 (FIG. 1) and methods 400 and 500 can be performed by a remote BMC (not shown) that is connected to IHS 100 via network 170.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. With reference to FIGS. 1 and 2, in one embodiment, BMC 140 via network 170 can send the real time cell voltage data 242 to a processing engine in a cloud based computing system, which in turn performs the pre-charge calculations and returns the pre-charge voltage 244, pre-charge time 240 and permanent failure voltage 250 back to BMC 140. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entire hardware embodiment or an embodiment combining software (including firmware, resident software, microcode, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method to enable capacity-based pre-charging of a battery having at least one cell, the method comprising:
   detecting, via a controller, a real time cell voltage for the at least one cell in the battery;
   determining if the real time cell voltage is less than a normal operating cell voltage;
   in response to the real time cell voltage being less than the normal operating cell voltage, calculating a capacity-based pre-charge value based on a full charge capacity and at least one cell parameter of the cell;
   calculating a pre-charge time based at least partially on the capacity-based pre-charge value;
   identifying a pre-charge voltage; and
   triggering the controller to pre-charge the battery using the calculated pre-charge time and the identified pre-charge voltage.

2. The method of claim 1, further comprising:
   the controller starting a timer in response to receipt of the trigger;
   monitoring for an expiration of the timer;
   in response to the timer expiring, detecting a post-charge cell voltage of the at least one cell;
   determining if the post-charge cell voltage is greater than the pre-charge voltage;
   in response to the post-charge cell voltage not being greater than the pre-charge voltage of the at least one cell, preventing the battery from being recharged; and
   indicating the battery as defective.

3. The method of claim 2, further comprising:
   in response to the post-charge cell voltage being greater than the pre-charge voltage, allowing the battery to be recharged.

4. The method of claim 1, further comprising:
   retrieving at least one cell parameter from a cell parameter table stored in a persistent storage device.

5. The method of claim 1, wherein the at least one cell parameter comprises a cell chemistry correction factor.

6. The method of claim 1, further comprising:
   determining a battery age;
   calculating a permanent failure cell voltage based on the battery age;
   detecting a real time cell voltage for each of the cells in the battery;
   determining, for each cell, if the real time cell voltage is less than the permanent failure cell voltage;

in response to the real time cell voltage being less than the permanent failure cell voltage for at least one of the cells, preventing the at least one cell from being recharged; and indicating the at least one cell as defective.

7. The method of claim 6, further comprising:

in response to the real time cell voltage being greater than the permanent failure cell voltage for the at least one of the cell, allowing the at least one cell to be recharged.

8. A battery management system for controlling battery operations, the battery management system comprising:

a battery having at least one cell;

a controller coupled to the battery, the controller having firmware executing thereon to enable capacity-based pre-charging of the battery, wherein the firmware configures the controller to:

detect a real time cell voltage for the at least one cell in the battery;

determine if the real time cell voltage is less than a normal operating cell voltage;

in response to the real time cell voltage being less than the normal operating cell voltage, calculate a capacity-based pre-charge value based on a full charge capacity and at least one cell parameter of the cell;

calculate a pre-charge time based at least partially on the capacity-based pre-charge value;

identify a pre-charge voltage; and trigger the controller to pre-charge the battery using the calculated pre-charge time and the identified pre-charge voltage.

9. The battery management system of claim 8, wherein the firmware further configures the controller to:

start a timer in response to receipt of the trigger;

monitor for an expiration of the timer;

in response to the timer expiring, detect a post-charge cell voltage of the at least one cell;

determine if the post-charge cell voltage is greater than the pre-charge voltage;

in response to the post-charge cell voltage not being greater than the pre-charge voltage, prevent the battery from being recharged; and indicate the battery as defective.

10. The battery management system of claim 9, wherein the firmware further configures the controller to:

in response to the post-charge cell voltage being greater than the pre-charge voltage, allow the battery to be recharged.

11. The battery management system of claim 8, wherein the firmware further configures the controller to:

retrieve the at least one cell parameter from a cell parameter table stored in a persistent storage device.

12. The battery management system of claim 8, wherein the at least one cell parameter comprises a cell chemistry correction factor.

13. The battery management system of claim 8, wherein the firmware further configures the controller to:

determine a battery age;

calculate a permanent failure cell voltage based on the battery age;

detect a real time cell voltage for the at least one cell in the battery;

determine if the real time cell voltage is less than the permanent failure cell voltage;

in response to the real time cell voltage being less than the permanent failure cell voltage, prevent the battery from being recharged; and indicate the battery as defective.

14. The battery management system of claim 13, wherein the firmware further configures the controller to:

in response to the real time cell voltage being greater than the permanent failure cell voltage, allowing the battery to be recharged.

15. An information handling system (IHS) comprising:

a battery having at least one cell, the battery operable to supply power to the information handling system;

a processor and a memory coupled to the processor via a system interconnect;

a controller communicatively coupled to the system interconnect and connected to the battery, the controller having firmware executing thereon to enable capacity-based pre-charging of the battery, wherein the firmware configures the controller to:

detect a real time cell voltage for the at least one cell in the battery;

determine if the real time cell voltage is less than a normal operating cell voltage;

in response to the real time cell voltage being less than the normal operating cell voltage, calculate a capacity-based pre-charge value based on a full charge capacity and at least one cell parameter of the cell;

calculate a pre-charge time based at least partially on the capacity-based pre-charge value;

identify a pre-charge voltage; and trigger the controller to pre-charge the battery using the calculated pre-charge time and the identified pre-charge voltage.

16. The information handling system of claim 15, wherein the firmware further configures the controller to:

start a timer in response to receipt of the trigger;

monitor for an expiration of the timer;

in response to the timer expiring, detect a post-charge cell voltage of the particular cell;

determine if the post-charge cell voltage is greater than the pre-charge voltage;

in response to the post-charge cell voltage not being greater than the pre-charge voltage, prevent the battery from being recharged; and indicate the battery as defective.

17. The information handling system of claim 16, wherein the firmware further configures the controller to:

in response to the post-charge cell voltage being greater than the pre-charge voltage, allow the battery to be recharged.

18. The information handling system of claim 15, wherein the firmware further configures the controller to:

retrieve the at least one cell parameter from a cell parameter table stored in a persistent storage device.

19. The information handling system of claim 15, wherein the least one cell parameter comprises a cell chemistry correction factor.

20. The information handling system of claim 15, wherein the firmware further configures the controller to:

determine a battery age;

calculate a permanent failure cell voltage based on the battery age;

detect a real time cell voltage for the at least one cell in the battery;

determine if the real time cell voltage is less than the permanent failure cell voltage;

in response to the real time cell voltage being less than the permanent failure cell voltage, prevent the battery from being recharged; and indicate the battery as defective.

21. The information handling system of claim 20, wherein the firmware further configures the controller to:
   in response to the real time cell voltage being greater than the permanent failure cell voltage, allowing the battery to be recharged.

* * * * *